(12) United States Patent
Toyama

(10) Patent No.: US 7,227,694 B2
(45) Date of Patent: Jun. 5, 2007

(54) LARGE APERTURE WIDE-ANGLE LENS AND CAMERA INCLUDING LARGE APERTURE WIDE-ANGLE LENS

(75) Inventor: Nobuaki Toyama, Saitama (JP)

(73) Assignee: Fujinon Corporation, Saitama (JP)

( * ) Notice: Subject to any disclaimer, the term of this patent is extended or adjusted under 35 U.S.C. 154(b) by 78 days.

(21) Appl. No.: 11/152,061

(22) Filed: Jun. 15, 2005

(65) Prior Publication Data

US 2005/0280900 A1    Dec. 22, 2005

(30) Foreign Application Priority Data

Jun. 16, 2004   (JP) .............................. 2004-178896

(51) Int. Cl.
*G02B 15/14* (2006.01)
*G02B 13/04* (2006.01)

(52) U.S. Cl. ...................................... 359/680; 359/749

(58) Field of Classification Search ........ 359/680–682, 359/691, 749–753, 708
See application file for complete search history.

(56) References Cited

U.S. PATENT DOCUMENTS 5,579,172 A * 11/1996 Aoki et al. .................. 359/688
5,760,973 A *  6/1998 Kawamura .................. 359/753
5,946,144 A *  8/1999 Yamamoto .................. 359/742
6,940,662 B2 *  9/2005 Sekita ........................ 359/770

FOREIGN PATENT DOCUMENTS

| JP | 9-236746   | 9/1997  |
| JP | 11-326756  | 11/1999 |
| JP | 2000-321490 | 11/2000 |
| JP | 2001-124985 | 5/2001  |

* cited by examiner

*Primary Examiner*—Scott J. Sugarman
*Assistant Examiner*—M. Hasan
(74) *Attorney, Agent, or Firm*—Arnold International; Jon W. Henry; Bruce Y. Arnold

(57) ABSTRACT

A large aperture wide-angle lens includes first and second lens groups separated by a stop. The first lens group includes more than one lens element and the second lens group includes, in order from the object side, a first lens component having at least one aspheric surface, having negative refractive power, and having increasingly negative refractive power toward the periphery, a second lens component having a convex surface on the image side, and a third lens component having at least one aspheric surface and having decreasingly positive refractive power or increasingly negative refractive power toward the periphery. The large aperture wide-angle lens includes six or seven lens components and seven lens elements, and preferably satisfies specified conditions related to f-number and focal length of the wide-angle lens, the maximum image height at the image surface, and the index of refraction of the object-side lens element of the second lens group.

20 Claims, 6 Drawing Sheets

ω=42.1°

ω=38.8°

ω=31.9°

ω=24°

ω=0°

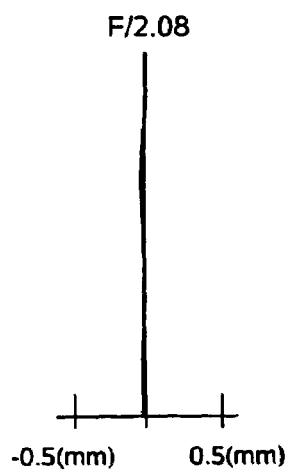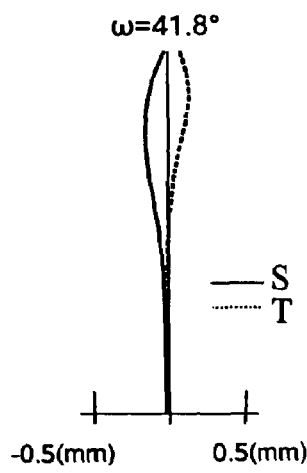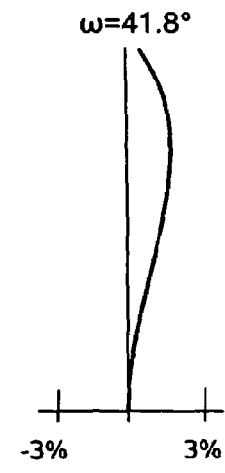
Fig. 5A    Fig. 5B    Fig. 5C
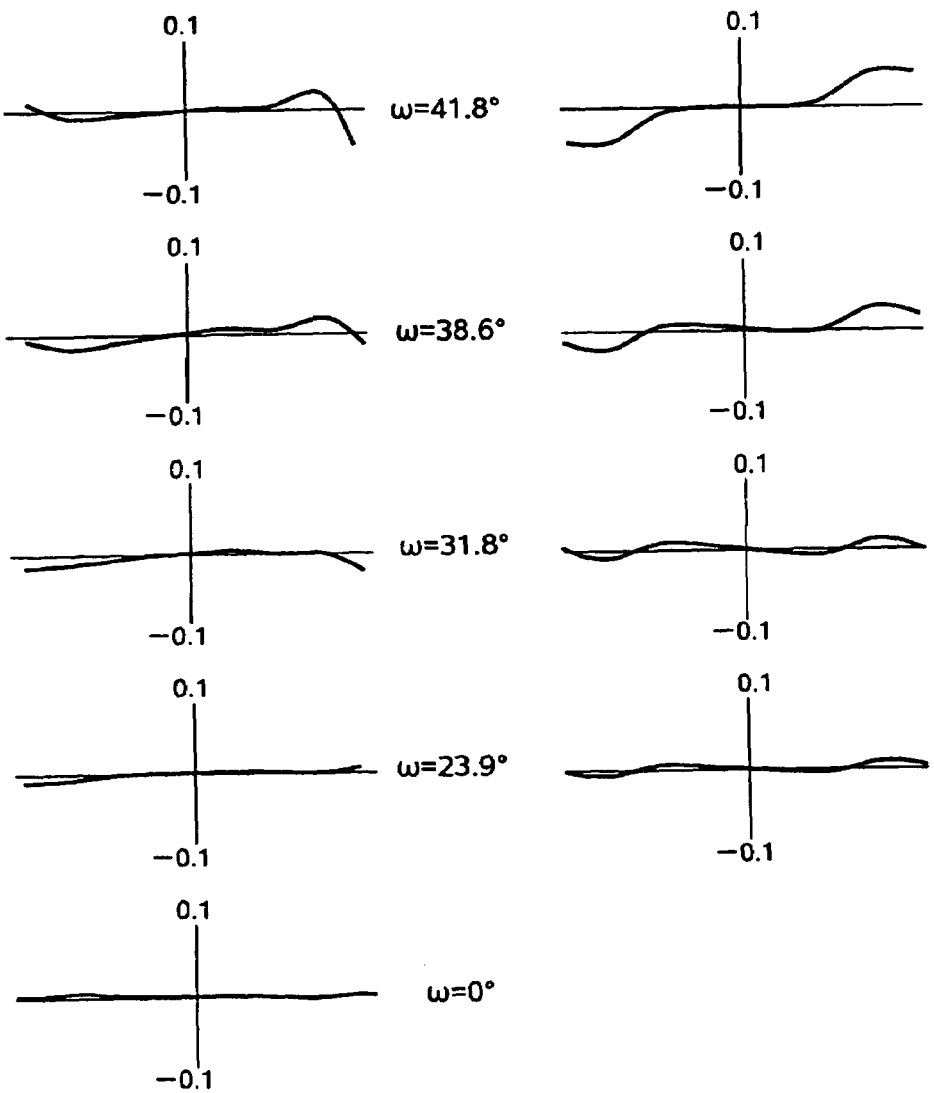
Fig. 5D

LARGE APERTURE WIDE-ANGLE LENS AND CAMERA INCLUDING LARGE APERTURE WIDE-ANGLE LENS

FIELD OF THE INVENTION

The present invention relates to a compact large aperture wide-angle lens suitable for use as an imaging lens in cameras, particularly photographic cameras using a photosensitive silver salt film.

BACKGROUND OF THE INVENTION

In recent years, as a compact camera, a camera using an image pickup device such as a CCD, has become common. In response to the popularity of such cameras, various compact imaging lenses using a relatively small number of lens elements and lens components have been developed.

One ultimate objective in camera development is for a camera that produces a finished image that is the same as the original scene viewed by the human eye. However, with compact cameras using an image pickup device, such as a CCD, it is difficult to produce a picture of a bright image which is the same as the image viewed by the human eye, even with high performance imaging capabilities, and the desired objective has not been achieved.

It is generally possible to take a bright picture of a short-range object by using stroboscopic lighting and recording techniques. However, distant objects are not adequately lit in stroboscopic lighting arrangements, and therefore images as bright as those seen by the human eye cannot be produced. This has also been proven by many photographers who have been unable to record beautiful night views. Furthermore, in the case of stroboscopic arrangements, there is also the problem that continuous imaging is difficult in order to secure the time required for stroboscopic exposures.

At the same time, the sensitivity of photographic films has recently been rapidly improved, and films with high sensitivity through super high sensitivity, such as ISO400, ISO800 or ISO1600, are commercially available. It is predicted that in the future, if a film with additionally higher sensitivity is sold in the marketplace, it will become possible to take a picture of a bright image which is the same as the image viewed by the human eye.

Compact imaging lenses for mounting in compact cameras that use photographic film are disclosed, for example, in Japanese Laid-Open Patent Applications H9-236746, H11-326756, 2000-321490, and 2001-124985. The lenses described in these applications satisfy conditions such as a short back focus, short length when retracted, and a small lens diameter, to some extent, and, for example, the lens described in Japanese Laid-Open Patent Application H9-236746 includes four lens components that, from the object side, have negative, positive, positive and negative refractive powers, providing a compact large aperture wide-angle lens with excellent performance when implemented in an F2.8, 28 mm focal length imaging lens.

However, it is known that the improvement of the sensitivity and graininess of a silver salt film has a so-called inverse proportional relationship, that is, as the film sensitivity is increased, improving brightness of an image, the image becomes grainier, creating a rough appearance that is unattractive. Additionally, the image becomes less sharp and problems in color reproduction occur, making it difficult to achieve the desired objective mentioned above of producing an image that looks the same as when the scene is viewed directly by the human eye.

As a result of many studies of the above problems by the inventor of the present application, the conclusion has been reached that it is possible to respond to the desired objective mentioned above by enhancing the film sensitivity to some extent so as to not cause any problem from the viewpoint of granularity while at the same time dramatically improving the brightness of the imaging lens used in photographic film cameras that use a silver salt photographic film.

Specifically, it is possible to reproduce an image that is the same as the image viewed by the human eye by using a silver salt photographic film with high sensitivity or with commercially available super high sensitivity in conjunction with an imaging lens having approximately 83 degrees or greater field angle and an f-number of approximately 2.0.

BRIEF SUMMARY OF THE INVENTION

The present invention relates to a large aperture wide-angle lens of compact construction, with a small number of lens components and lens elements, with a small lens diameter and a short back focus, with a wider angle of view, with improved brightness, and with excellent performance. The present invention further relates to a camera using such a large aperture wide-angle lens as an imaging lens.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 5A-5D show spherical aberration, astigmatism, distortion, and coma, respectively, of the large aperture wide-angle lens of Embodiment 2 of the present invention.

DETAILED DESCRIPTION OF THE INVENTION

First, definitions of the terms "lens element," "lens component," and "lens group," that relate to the following detailed description will be given. The term "lens element" is herein defined as a single transparent mass of refractive material having two opposed refracting surfaces, which surfaces are positioned at least generally transverse to the optical axis of the lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." Alternatively, a lens component may frequently be made by cementing lens elements together.

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified.

Figure 1:
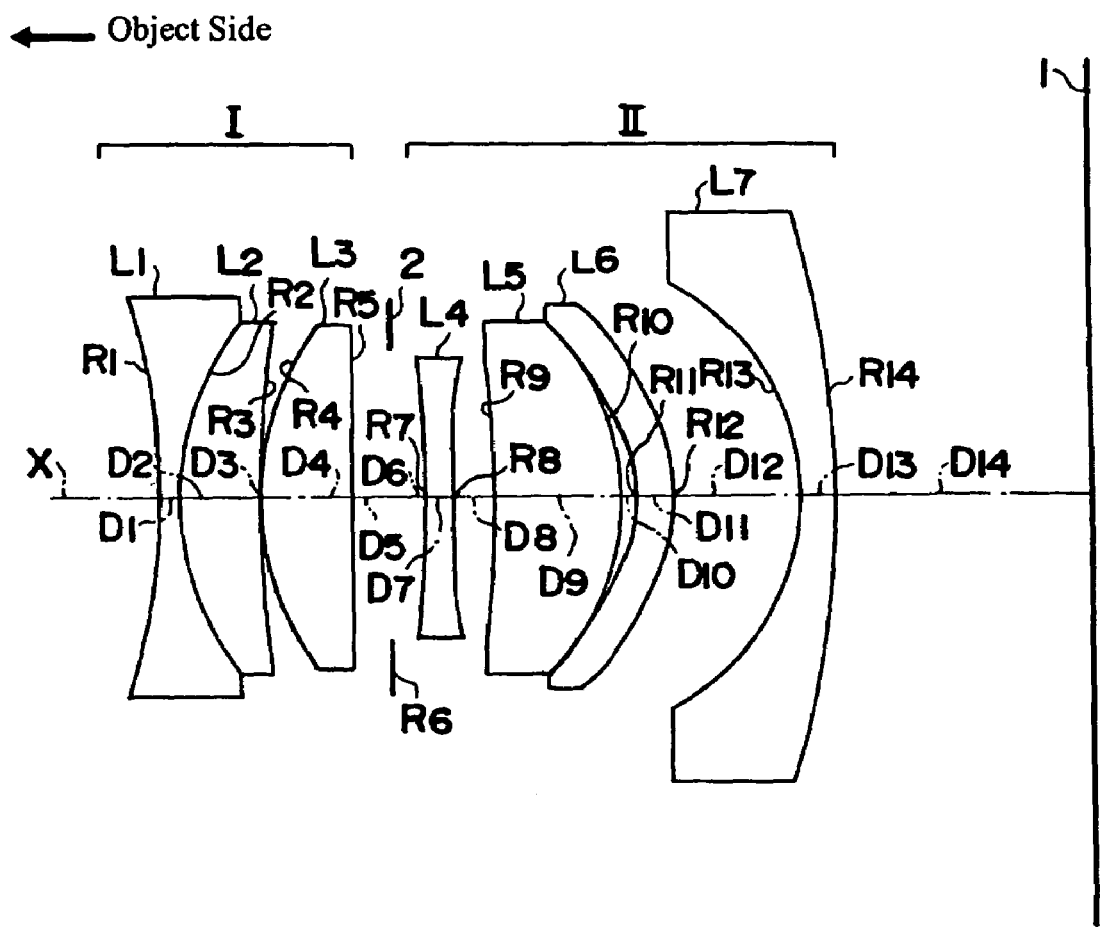
FIG. 1 shows a cross-sectional view of the large aperture wide-angle lens of Embodiment 1 of the present invention.

A general description of the lens of the present invention that pertains to disclosed embodiments of the invention will now be described with reference to FIG. 1 that shows Embodiment 1. A horizontal arrow at the upper left of FIG. 1 that points left indicates the object side of the lens. In FIG. 1, lens elements are referenced by the letter L followed by a number denoting their order from the object side of the lens along the optical axis X, from L1 to L7. Similarly, the radii of curvature of the optical surfaces are referenced by the letter R followed by a number denoting their order from the object side of the lens, from R1 to R14 in FIG. 1, as well as in FIG. 3 that shows Embodiment 3 (but from R1 to R15 in FIG. 2 that shows Embodiment 2). The on-axis surface spacings along the optical axis X of the various optical surfaces are referenced by the letter D followed by a number denoting their order from the object side of the lens, from D1 to D14 in FIG. 1, as well as in FIG. 3 that shows Embodiment 3 (but from D1 to D15 in FIG. 2 that shows Embodiment 2). In a similar manner, two lens groups are labeled I and II in order from the object side of the lens, and the lens elements and lens components belonging to each lens group are indicated by brackets adjacent the labels I and II. Also shown in FIG. 1 is a diaphragm or stop 2 that controls the amount of light passing through the large aperture wide-angle lens that forms an image on an image plane 1 at the right of FIG. 1.

As shown in FIG. 1, the large aperture wide-angle lens of the present invention includes, in order along the optical axis X from the object side, the first lens group I that includes three lens elements, the stop 2, and the second lens group II that includes four lens elements. The first lens group I includes, in order from the object side, a first biconcave lens element L1, a second lens element L2 having positive refractive power and a convex surface on the object side, and a third lens element L3 also having positive refractive power and a convex surface on the object side. The second lens group II includes, in order from the object side of the second lens group, a fourth lens element L4 (the first lens element from the object side of the second lens group II) having at least one aspheric surface, having negative refractive power, and having increasingly negative refractive power from the optical axis toward the periphery, a fifth lens element L5 (the second lens element from the object side of the second lens group II) having positive refractive power and having a convex surface on the image side, a sixth lens element L6 (the third lens element from the object side of the second lens group II) having at least one aspheric surface and having decreasingly positive refractive power or increasingly negative refractive power from the optical axis toward the periphery, and a seventh lens element L7 (the fourth lens element from the object side of the second lens group II) having negative refractive power and a concave object-side surface.

A primary feature of the present invention, as exemplified in Embodiment 1, is the presence of the fifth lens element L5 having positive refractive power and a convex image-side surface being interposed between the two lens elements L4 and L6 each having at least one aspheric surface and each having refractive power that becomes more negative (which includes becoming less positive in the case of lens element L6) from the optical axis toward the periphery within the second lens group II, which is on the image side of the stop 2. This construction enables excellent correction of various aberrations, such as image plane curvature and coma aberration, even with a compact construction and a small number of lens components and lens element, a small lens diameter, a short back focus, an f-number of 2.0 or smaller, a field angle of approximately 83 degrees or larger, and overall excellent performance. In particular, if the large aperture wide-angle lens of the present invention is used in a photographic camera using, for example, a silver salt photographic film, it becomes possible to take bright pictures, like those viewed by the human eye, with excellent picture quality.

With regard to the fifth lens element L5 of Embodiment 1, it is preferable that the absolute value of the curvature of the image-side surface of this lens element be greater than the curvature of the object-side surface in order to help achieve the desired results discussed above.

Additionally, it is preferable that both surfaces of the first and third lens elements of the second lens group II, that is, the fourth lens element L4 and the sixth lens element L6 of Embodiment 1, be aspheric, further modifying the requirement that at least one surface of each lens element be aspheric.

Furthermore, the fourth lens element of the second lens group having negative refractive power and a concave object-side surface, as is true of lens element L7 of Embodiment 1, is a preferable feature of the present invention.

Also, the first lens element of the second lens group having negative refractive, and the third lens element of the second lens group having a convex image-side surface, but having either positive or negative refractive power, are preferable features of the present invention exemplified in Embodiment 1 by lens elements L4 and L6.

Additionally, Embodiment 1 exemplifies preferable features of the first lens group I of the present invention, in terms of the first lens element L1 being a biconcave lens and each of the second and third lens elements L2 and L3 on the image-side of the first lens element L1 having positive refractive power and a convex object-side surface.

Also, it is preferable that the sixth lens element L6, which includes at least one aspheric surface, be made of plastic. By being made of plastic, this sixth lens element L6 may be manufactured at low cost even though it has a comparatively large diameter in the lens system. Because this lens element has little refractive power, the sensitivity of plastic to temperature changes will not be a problem in this lens system, as well as the use of plastic assisting in obtaining a light weight construction along with reductions in costs.

Furthermore, it is preferable that the first lens element L1 and the second lens element L2 be joined together to form a lens component as shown in FIG. 1. In the large aperture wide-angle lens of the present invention, if a luminous flux with a large angle of incidence from the periphery of the field of view is totally reflected on the lens surface, it may adversely affect the performance. Using a lens component made of lens elements that are joined, for example by optical cement, can prevent this total reflection.

Furthermore, the large aperture wide-angle lens of the present invention preferably satisfies the following Conditions (1) and (2):

$1.7 < F_{NO} < 2.8$   Condition (1)

$0.77 < Y/f < 1.1$   Condition (2)

where $F_{NO}$ is the f-number of the large aperture wide-angle lens;
Y is the maximum image height at the image plane of the large aperture wide-angle lens; and
f is the focal length of the large aperture wide-angle lens.

If the lower limit of Condition (1) is not satisfied, the aperture becomes so large that the correction of spherical aberration becomes difficult. On the other hand, if the upper limit of Condition (1) is not satisfied, a large aperture (i.e., a sufficiently wide-angle lens), which is a desired feature of the present invention, will not be provided. Similarly, if the lower limit of Condition (2) is not satisfied, a large aperture will not be provided. On the other hand, if the upper limit of Condition (2) is not satisfied, the field angle (i.e., the angle of view) is too large and the image plane curvature and the coma aberrations cannot be sufficiently corrected.

In addition, the large aperture wide-angle lens of the present invention preferably satisfies the following Condition (3):

$Nd_{21} > 1.65$   Condition (3)

where $Nd_{21}$ is the refractive index of the fourth lens element L4, which is the first lens element of the second lens group II, at the d-line (587.6 nm).

If Condition (3) is not satisfied, it becomes difficult to correct the aberration of image plane curvature.

More preferably, Condition (3) is further limited by the large aperture wide-angle lens of the present invention satisfying the following Condition (3') in order to assure even better correction of image plane curvature:

$Nd_{21} > 1.75$   Condition (3').

Three embodiments of the present invention will be individually described below with reference to the drawings.

In the three embodiments of the large aperture wide-angle lens of the present invention described below, the lens surfaces that are aspheric are defined using the following equation:

$Z = [\{(Y^2)/R\}/\{1+(1-K \cdot Y^2/R^2)^{1/2}\}] + \Sigma(A_i \cdot Y^i)$ where Z is the length (in mm) of a line drawn from a point on the aspheric lens surface at a distance Y from the optical axis to the tangential plane of the aspheric surface vertex,
R is the radius of curvature (in mm) of the aspheric lens surface on the optical axis,
Y is the distance (in mm) from the optical axis,
K is the eccentricity, and
$A_i$ is the ith aspheric coefficient, and the summation extends over i.

In Embodiments 1 and 2 of the invention described below, aspheric coefficients $A_3$-$A_{10}$ are non-zero for the lens surfaces that are aspheric and all other aspheric coefficients are zero. Unlike the common use of only even order aspheric coefficients, due to changing circumstances, such as the recent demand for higher resolution imaging and the availability of faster performance computers for lens calculations, the present invention uses both even and odd order aspheric coefficients up to the tenth order. Using aspheric coefficients associated with the odd order terms results in an increase in the choices of the aspheric shape of the aspheric surfaces, making it possible to more independently determine the shape of the aspheric surface in the central region on and near the optical axis and in the peripheral region. This makes it possible to determine aspheric shapes that provide excellent correction of aberrations in both the central region and the peripheral region. In particular, this enables the fourth lens element L4 (the first lens element from the object side of the second lens group II) to have increasingly negative refractive power from the optical axis toward the periphery and the sixth lens element L6 (the third lens element from the object side of the second lens group II) to have decreasingly positive refractive power or increasingly negative refractive power from the optical axis toward the periphery based on the use of at least one aspheric surface, as discussed previously, and, more especially, based on the use of two aspheric surfaces in each of the lens elements L4 and L6 of the three embodiments of the present invention described below. In Embodiment 3 of the invention described below, aspheric coefficients $A_3$-$A_{13}$ are non-zero for the lens surfaces that are aspheric and all other aspheric coefficients are zero, which results in an even greater increase in the choices of the aspheric shape of the aspheric surfaces.

EMBODIMENT 1

FIG. 1 shows a cross-sectional view of the large aperture wide-angle lens of Embodiment 1 of the present invention. As shown in FIG. 1, the large aperture wide-angle lens of Embodiment 1 includes, in order from the object side, the first lens group I, the stop 2, and the second lens group II. In order from the object side, the first lens group I includes three lens elements, L1, L2, and L3, and the second lens group II includes four lens elements, L4, L5, L6, and L7. A luminous flux that enters from the object side is efficiently focused on an image plane 1 of FIG. 1, where a photographic film may be located.

Within the first lens group I, the first lens element L1 is a biconcave lens element with an image-side surface of greater curvature; the second lens element L2 is a meniscus lens element having positive refractive power, having a convex object-side surface, and joined with the first lens element L1 to form a lens component; and the third lens element L3 is a biconvex lens element with an object-side surface of greater curvature.

Additionally, within the second lens group II, the fourth lens element L4 has negative refractive power that becomes increasingly negative toward the periphery and has two aspheric surfaces; the fifth lens element L5 is a meniscus lens element having positive refractive power and a convex image-side surface; the sixth lens element L6 has negative refractive power that becomes increasingly negative toward the periphery and has two aspheric surfaces; and the seventh lens element L7 is a meniscus lens element having negative refractive power and a concave object-side surface.

Table 1 below lists the surface number # in order from the object side, the radius of curvature R (in mm) of each surface on the optical axis, the on-axis surface spacing D (in mm), as well as the refractive index $N_d$ and the Abbe number $\nu_d$ (both at the d-line of 587.6 nm) of each optical element for Embodiment 1. Listed in the bottom portion of Table 1 are the focal length f, the f-number $F_{NO}$, and the half-field angle $\omega$ of Embodiment 1.

TABLE 1

| # | R | D | $N_d$ | $\nu_d$ |
|---|---|---|---|---|
| 1 | −26.9469 | 0.710 | 1.67270 | 32.1 |
| 2 | 11.5703 | 2.819 | 1.88300 | 40.8 |
| 3 | 45.7265 | 0.100 | | |
| 4 | 12.4277 | 3.186 | 1.80400 | 46.6 |
| 5 | −897.7756 | 1.348 | | |
| 6 | ∞ (stop) | 1.148 | | |
| 7* | −94.2361 | 1.000 | 1.68893 ($Nd_{21}$) | 31.1 |
| 8* | 117.2886 | 1.456 | | |
| 9 | −58.8320 | 4.493 | 1.72916 | 54.7 |
| 10 | −10.2350 | 0.600 | | |
| 11* | −5.9747 | 1.315 | 1.49023 | 57.5 |
| 12* | −7.2650 | 4.512 | | |
| 13 | −9.6408 | 1.189 | 1.59551 | 39.2 |
| 14 | −41.8759 | 9.207 | | |
| 15 | ∞ | | | |
| f = 23.937 | $F_{NO}$ = 2.000 | $\omega$ = 42.1° | | |

The surfaces with a * to the right of the surface number in Table 1 are aspheric lens surfaces, and the aspheric surface shape is expressed by Equation (A) above. As indicated in Table 1, both surfaces of lens elements L4 and L6 of the second lens group II are aspheric.

Table 2 below lists the values of the constant K and the aspheric coefficients $A_3$-$A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E−2" represents the number $1.0 \times 10^{-2}$.

The large aperture wide-angle lens of Embodiment 1 satisfies Conditions (1)-(3) above, as set forth in Table 3 below.

TABLE 3

| Condition No. | Condition | Value |
|---|---|---|
| (1) | 1.7 < $F_{NO}$ < 2.8 | 2.000 |
| (2) | 0.77 < Y/f < 1.1 | 0.904 |
| (3) | $Nd_{21}$ > 1.65 | 1.689 |

Figure 4A:
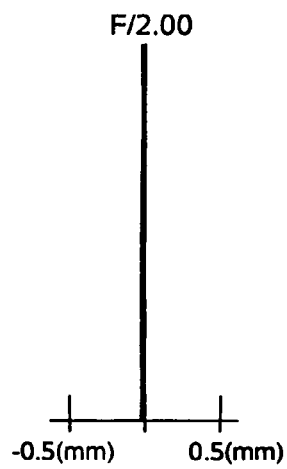
FIGS. 4A-4D show spherical aberration, astigmatism, distortion, and coma, respectively, of the large aperture wide-angle lens of Embodiment 1 of the present invention.
Figure 4B:
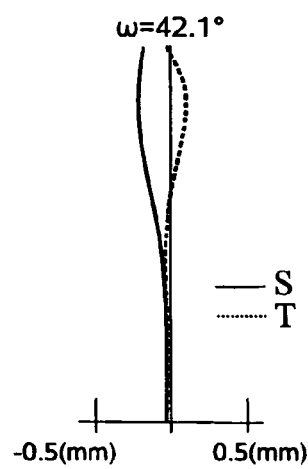
Figure 4C:
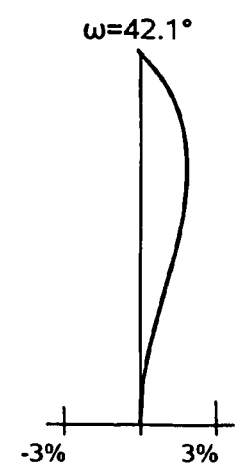
Figure 4D:
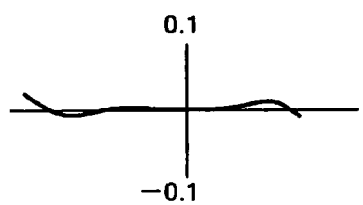
Figure 4D:
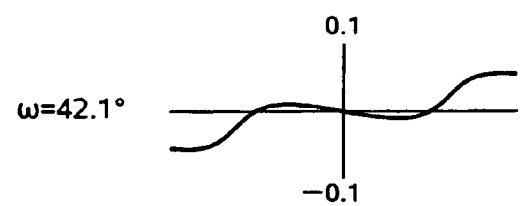
Figure 4D:
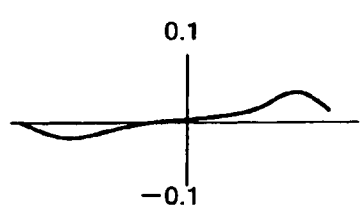
Figure 4D:
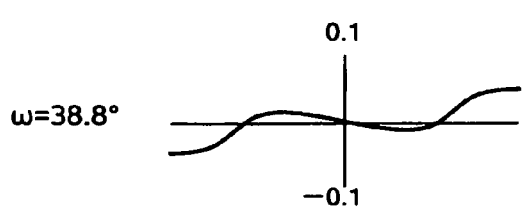
Figure 4D:
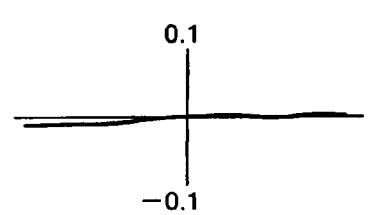
Figure 4D:
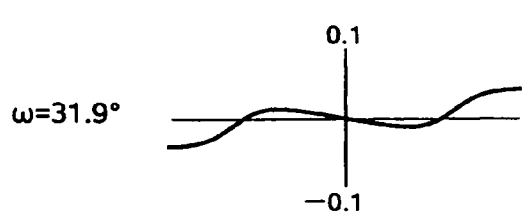
Figure 4D:
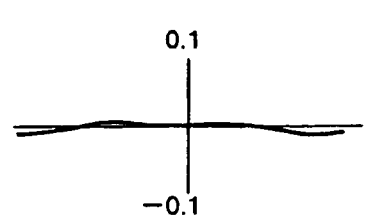
Figure 4D:
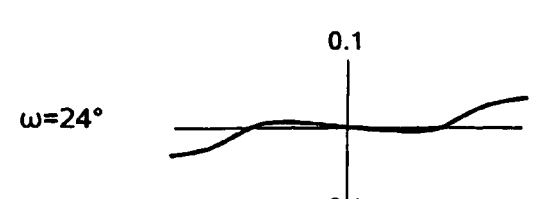
Figure 4D:
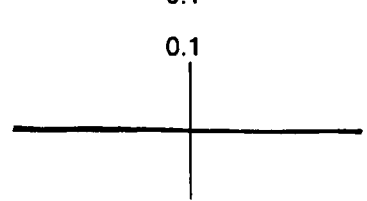

FIGS. 4A-4D show the spherical aberration, astigmatism, distortion, and coma, respectively, for the d-line (587.6 nm) of the large aperture wide-angle lens of Embodiment 1. In FIG. 4A, the spherical aberration is shown for an $F_{NO}$ equal to 2.00. FIGS. 4B and 4C show the astigmatism (in the sagittal image plane S and the tangential image plane T) and the distortion, respectively, up to a maximum half-field angle $\omega$ of 42.1 degrees. FIG. 4D shows the coma (in mm) for various half-field angles $\omega$ for both the tangential (right column) and sagittal (left column) image surfaces.

As is clear from FIGS. 4A-4D and Tables 1-3 above, Embodiment 1 of the present invention provides a large aperture wide-angle lens with an f-number of 2.0, a focal length of very nearly 24 mm, and excellent correction of aberrations throughout the field of view.

EMBODIMENT 2

Figure 2:
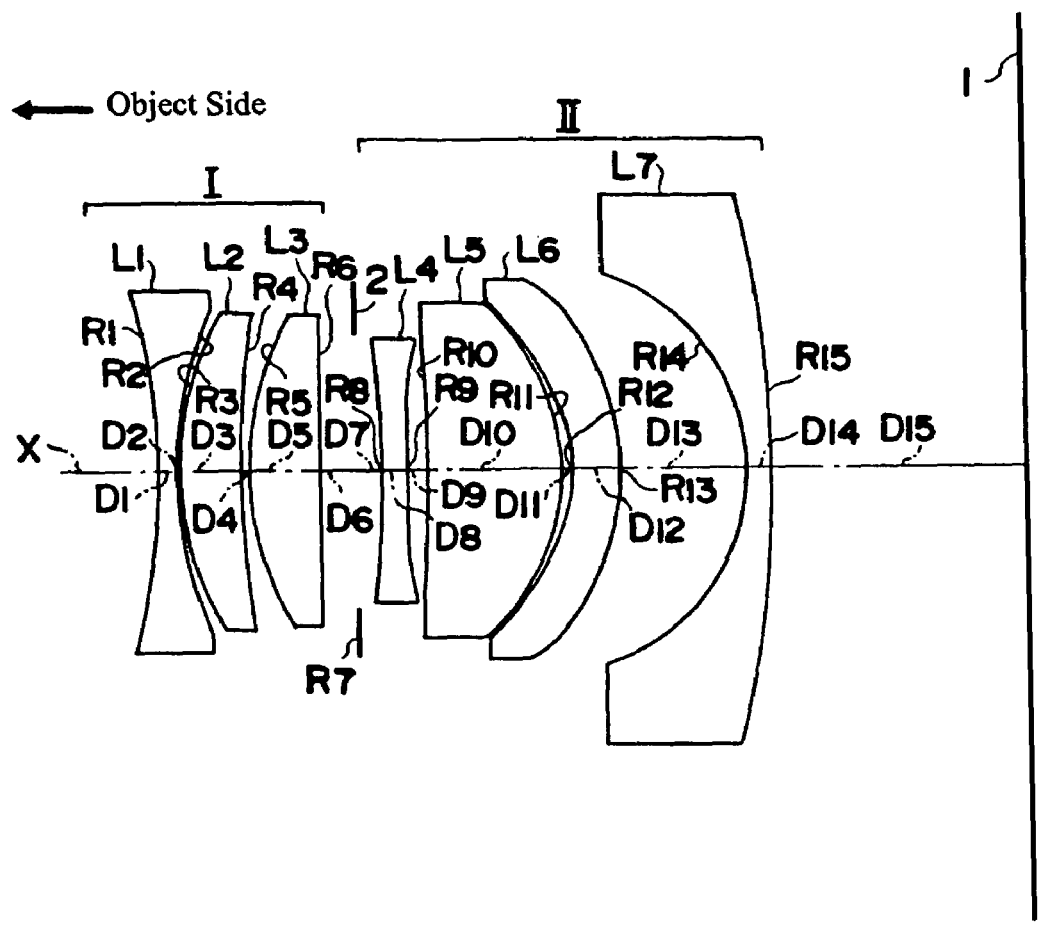
FIG. 2 shows a cross-sectional view of the large aperture wide-angle lens of Embodiment 2 of the present invention.

FIG. 2 shows a cross-sectional view of the large aperture wide-angle lens of Embodiment 2 of the present invention. Embodiment 2 is very similar to Embodiment 1 and uses the same number of lens elements. However, Embodiment 2 differs from Embodiment 1 in that in Embodiment 2, lens elements L1 and L2 are separate lens components rather than joined as one lens component as in Embodiment 1, and Embodiment 2 also differs from Embodiment 1 in that in Embodiment 2, lens element L3 is a meniscus lens element with the convex surface on the object side rather than a biconvex lens element as in Embodiment 1 (but lens element L3 has positive refractive power in both Embodiments 1 and 2).

TABLE 2

| # | K | $A_3$ | $A_4$ | $A_5$ | $A_6$ |
|---|---|---|---|---|---|
| 7 | −9.2958100E−2 | −8.4519160E−6 | −2.1191010E−4 | 5.6798983E−6 | −7.0157173E−7 |
| 8 | −1.7450650E−1 | −2.4270428E−4 | 2.3731586E−4 | −5.0795520E−6 | 1.1618334E−6 |
| 11 | −8.0352020E−1 | −1.6985406E−4 | 1.0612901E−4 | 9.1805384E−6 | −9.6058596E−7 |
| 12 | 7.4700940E−1 | 6.0265826E−4 | 4.0221423E−4 | 6.0797677E−5 | −3.5940695E−6 |

| # | $A_7$ | $A_8$ | $A_9$ | $A_{10}$ |
|---|---|---|---|---|
| 7 | 1.3737124E−6 | −2.1954871E−8 | −2.1846907E−8 | −2.1154325E−10 |
| 8 | 1.8827274E−6 | 1.1480476E−8 | −2.1213930E−8 | −4.3259050E−10 |
| 11 | −3.2069339E−7 | 2.3120167E−8 | 1.8683996E−9 | −4.2183078E−10 |
| 12 | −9.7382370E−7 | 3.9598525E−8 | 1.0416038E−8 | −6.4297235E−10 |

Furthermore, the stop 2 is located along the optical axis X between the first and second lens groups I and II at the position where it serves as an aperture stop for the large aperture wide-angle lens of Embodiment 1, which is adjacent to and on the object-side of the fourth lens element L4 at a distance of 1.148 mm from the object-side surface of the fourth lens element L4.

Table 4 below lists the surface number # in order from the object side, the radius of curvature R (in mm) of each surface on the optical axis, the on-axis surface spacing D (in mm), as well as the refractive index $N_d$ and the Abbe number $\nu_d$ (both at the d-line of 587.6 nm) of each optical element for Embodiment 2. Listed in the bottom portion of Table 4 are the focal length f, the f-number $F_{NO}$, and the half-field angle $\omega$ of Embodiment 2.

TABLE 4

| # | R | D | $N_d$ | $v_d$ |
|---|---|---|---|---|
| 1 | −28.9663 | 0.700 | 1.64769 | 33.8 |
| 2 | 17.0670 | 0.100 | | |
| 3 | 12.9706 | 2.357 | 1.83481 | 42.7 |
| 4 | 44.3656 | 0.240 | | |
| 5 | 12.9705 | 2.592 | 1.75500 | 52.3 |
| 6 | 285.6641 | 1.348 | | |
| 7 | ∞ (stop) | 0.952 | | |
| 8* | −48.8547 | 1.000 | 1.80518 ($Nd_{21}$) | 25.4 |
| 9* | 786.6191 | 0.687 | | |
| 10 | −66.8617 | 5.157 | 1.72916 | 54.7 |
| 11 | −8.8918 | 0.325 | | |
| 12* | −6.4481 | 1.835 | 1.49023 | 57.5 |
| 13* | −9.1797 | 4.708 | | |
| 14 | −8.5018 | 1.000 | 1.53172 | 48.9 |
| 15 | −43.7486 | 9.499 | | |
| 16 | ∞ | | | | f = 24.038   $F_{NO}$ = 2.068   ω = 41.8°

The surfaces with a * to the right of the surface number in Table 4 are aspheric lens surfaces, and the aspheric surface shape is expressed by Equation (A) above. As indicated in Table 4, both surfaces of lens elements L4 and L6 of the second lens group II are aspheric.

Table 5 below lists the values of the constant K and the aspheric coefficients $A_3$-$A_{10}$ used in Equation (A) above for each of the aspheric lens surfaces of Table 4. Aspheric coefficients that are not present in Table 5 are zero. An "E" in the data indicates that the number following the "E" is the exponent to the base 10. For example, "1.0E−2" represents the number $1.0 \times 10^{-2}$.

TABLE 5

| # | K | $A_3$ | $A_4$ | $A_5$ | $A_6$ |
|---|---|---|---|---|---|
| 8 | −8.2379600E−2 | −9.3001766E−6 | −1.3006444E−4 | 2.0496026E−5 | −7.7840725E−7 |
| 9 | −1.7535590E−1 | −6.1817895E−5 | 2.4720280E−4 | 2.4490749E−5 | 9.6305039E−7 |
| 12 | −7.3960490E−1 | −2.3001951E−4 | 8.9245630E−5 | −1.5441178E−5 | −9.1490877E−7 |
| 13 | 1.3145055 | 2.5040253E−4 | 3.6725526E−4 | 2.5978329E−5 | −3.5964841E−6 |

| # | $A_7$ | $A_8$ | $A_9$ | $A_{10}$ |
|---|---|---|---|---|
| 8 | 1.0761839E−6 | −2.7179305E−8 | −2.8556182E−8 | −2.8768881E−10 |
| 9 | 1.5394581E−6 | 9.5417823E−9 | −2.0860561E−8 | −3.9700251E−10 |
| 12 | −9.7602312E−8 | 2.5252042E−8 | 2.3585694E−9 | −4.4441539E−10 |
| 13 | −5.2302006E−7 | 4.3743313E−8 | 7.3712288E−9 | −8.1498257E−10 |

Furthermore, the stop 2 is located along the optical axis X between the first and second lens groups I and II at the position where it serves as an aperture stop for the large aperture wide-angle lens of Embodiment 2, which is adjacent to and on the object-side of the fourth lens element L4 at a distance of 0.952 mm from the object-side surface of the fourth lens element L4.

The large aperture wide-angle lens of Embodiment 2 satisfies Conditions (1)-(3) above, as set forth in Table 6 below. Additionally, Embodiment 2 satisfies Condition (3') above.

TABLE 6

| Condition No. | Condition | Value |
|---|---|---|
| (1) | $1.7 < F_{NO} < 2.8$ | 2.068 |
| (2) | $0.77 < Y/f < 1.1$ | 0.900 |
| (3) | $Nd_{21} > 1.65$ | 1.805 |

FIGS. 5A-5D show the spherical aberration, astigmatism, distortion, and coma, respectively, for the d-line (587.6 nm) of the large aperture wide-angle lens of Embodiment 2. In FIG. 5A, the spherical aberration is shown for an $F_{NO}$ equal to 2.08. FIGS. 5B and 5C show the astigmatism (in the sagittal image plane S and the tangential image plane T) and the distortion, respectively, up to a maximum half-field angle ω of 41.8 degrees. FIG. 5D shows the coma (in mm) for various half-field angles c for both the tangential (right column) and sagittal (left column) image surfaces.

As is clear from FIGS. 5A-5D and Tables 4-6 above, Embodiment 2 of the present invention provides a large aperture wide-angle lens with an f-number of 2.068, a focal length of very nearly 24 mm, and excellent correction of aberrations throughout the field of view.

EMBODIMENT 3

Figure 3:
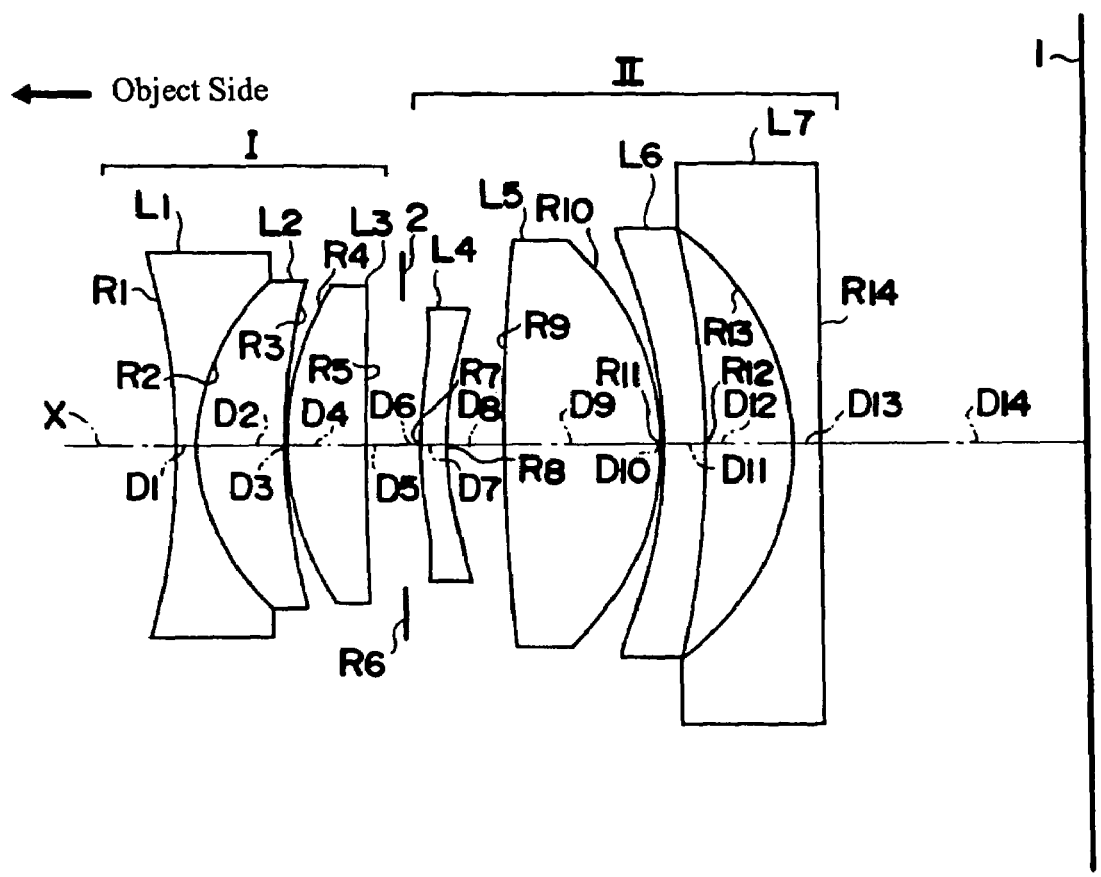
FIG. 3 shows a cross-sectional view of the large aperture wide-angle lens of Embodiment 3 of the present invention.

FIG. 3 shows a cross-sectional view of the large aperture wide-angle lens of Embodiment 3 of the present invention. Embodiment 3 is similar to Embodiment 1 and uses the same number of lens elements and lens components. However, Embodiment 3 differs from Embodiment 1 in that in Embodiment 3, lens element L3 is a meniscus lens element with the convex surface on the object side rather than a biconvex lens element as in Embodiment 1 (but lens element L3 has positive refractive power in both Embodiments 1 and 3). Additionally, Embodiment 3 differs from Embodiment 1 in that in Embodiment 3, lens element L5 is a biconvex lens element rather than a meniscus lens element as in Embodiment 1 (but the image-side surface has greater curvature in both Embodiments 1 and 3), and Embodiment 3 differs from Embodiment 1 in that in Embodiment 3, lens element L7 is a biconcave lens element rather than a meniscus lens element as in Embodiment 1 (but the object-side surface has greater curvature in both Embodiments 1 and 3). Also, Embodiment 3 differs from Embodiment 1 in that in Embodiment 3, the object-side surface of lens element L4 is convex rather than concave as in Embodiment 1.

Table 7 below lists the surface number # in order from the object side, the radius of curvature R (in mm) of each surface on the optical axis, the on-axis surface spacing D (in mm), as well as the refractive index $N_d$ and the Abbe number $v_d$ (both at the d-line of 587.6 nm) of each optical element for Embodiment 3. Listed in the bottom portion of Table 7 are the focal length f, the f-number $F_{NO}$, and the half-field angle ω of Embodiment 3.

TABLE 7

| # | R | D | $N_d$ | $v_d$ |
|---|---|---|---|---|
| 1 | −29.5448 | 0.710 | 1.64769 | 33.8 |
| 2 | 9.2020 | 3.259 | 1.88300 | 40.8 |
| 3 | 25.7472 | 0.100 | | |
| 4 | 12.6172 | 2.933 | 1.80400 | 46.6 |
| 5 | 130.8193 | 1.421 | | |
| 6 | ∞ (stop) | 0.575 | | |
| 7* | 13.2880 | 1.000 | 1.68893 ($Nd_{21}$) | 31.1 |
| 8* | 10.9101 | 2.159 | | |
| 9 | 80.3080 | 5.915 | 1.72916 | 54.7 |
| 10 | −11.3907 | 0.100 | | |
| 11* | −17.2229 | 1.579 | 1.49023 | 57.5 |
| 12* | −26.7866 | 3.227 | | |
| 13 | −10.9064 | 1.000 | 1.58144 | 40.7 |
| 14 | 44800600.7662 | 10.105 | | |
| 15 | ∞ | | | |
| | f = 23.941 | $F_{NO}$ = 1.994 | ω = 41.6° | |

The surfaces with a * to the right of the surface number in Table 7 are aspheric lens surfaces, and the aspheric surface shape is expressed by Equation (A) above. As indicated in Table 7, both surfaces of lens elements L4 and L6 of the second lens group II are aspheric.

Table 8 below lists the values of the constant K and the aspheric coefficients $A_3$-$A_{13}$ used in Equation (A) above for each of the aspheric lens surfaces of Table 7. Aspheric coefficients that are not present in Table 8 are zero. An "E" in the data indicates that the number following the "E" is the exponent to the base 10. For example, "1.0E−2" represents the number $1.0 \times 10^{-2}$.

TABLE 8

| # | K | $A_3$ | $A_4$ | $A_5$ | $A_6$ | $A_7$ |
|---|---|---|---|---|---|---|
| 7 | 3.1159470E−1 | −3.3806857E−4 | −3.9731559E−4 | −1.0724916E−4 | −1.6687845E−6 | 1.2128268E−6 |
| 8 | 1.7233540E−1 | −4.1842453E−4 | −7.4527082E−5 | −1.2628946E−4 | 3.7720924E−7 | 1.8734550E−6 |
| 11 | 1.0572428 | 5.0877706E−4 | −3.8970387E−6 | 8.9428854E−6 | 2.0407906E−7 | −1.9488064E−7 |
| 12 | 9.3272340E−1 | 6.4314635E−4 | 2.1620920E−5 | 3.6226440E−6 | −3.9753407E−8 | −8.1436235E−8 |

| # | $A_8$ | $A_9$ | $A_{10}$ | $A_{11}$ | $A_{12}$ | $A_{13}$ |
|---|---|---|---|---|---|---|
| 7 | −1.0474674E−8 | 5.2279487E−10 | 6.1372419E−11 | 3.3590719E−12 | 3.1681410E−14 | 2.9565867E−16 |
| 8 | 2.1172242E−8 | −2.9923476E−9 | −1.8076624E−10 | 2.3418557E−12 | 2.7475526E−14 | 2.2198238E−16 |
| 11 | −4.2895437E−9 | 7.5434999E−10 | 1.3083557E−10 | 2.0605802E−12 | 8.3937672E−15 | −5.5629501E−16 |
| 12 | −1.6212998E−9 | −9.8415989E−10 | 9.4126126E−11 | 4.1782545E−12 | 1.2031340E−13 | 3.0664456E−15 |

Furthermore, the stop 2 is located along the optical axis X between the first and second lens groups I and II at the position where it serves as an aperture stop for the large aperture wide-angle lens of Embodiment 3, which is adjacent to and on the object-side of the fourth lens element L4 at a distance 0.575 mm from the object-side surface of the fourth lens element L4.

The large aperture wide-angle lens of Embodiment 3 satisfies Conditions (1)-(3) above, as set forth in Table 9 below.

TABLE 9

| Condition No. | Condition | Value |
|---|---|---|
| (1) | 1.7 < $F_{NO}$ < 2.8 | 1.994 |
| (2) | 0.77 < Y/f < 1.1 | 0.904 |
| (3) | $Nd_{21}$ > 1.65 | 1.729 |

Figure 6A:
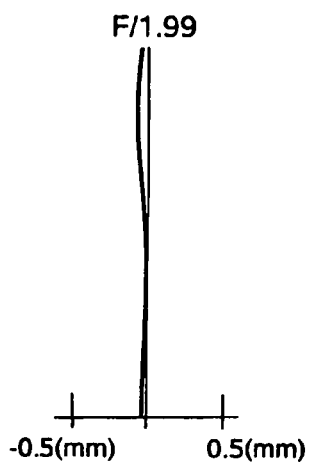
FIGS. 6A-6D show spherical aberration, astigmatism, distortion, and coma, respectively, of the large aperture wide-angle lens of Embodiment 3 of the present invention.
Figure 6B:
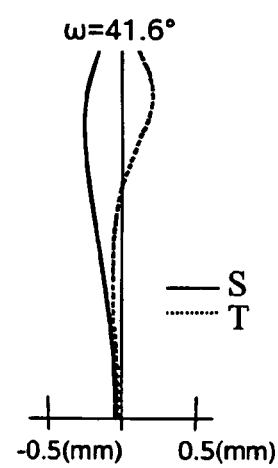
Figure 6C:
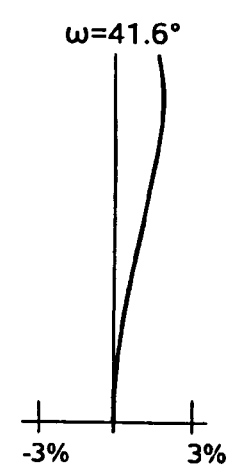
Figure 6D:
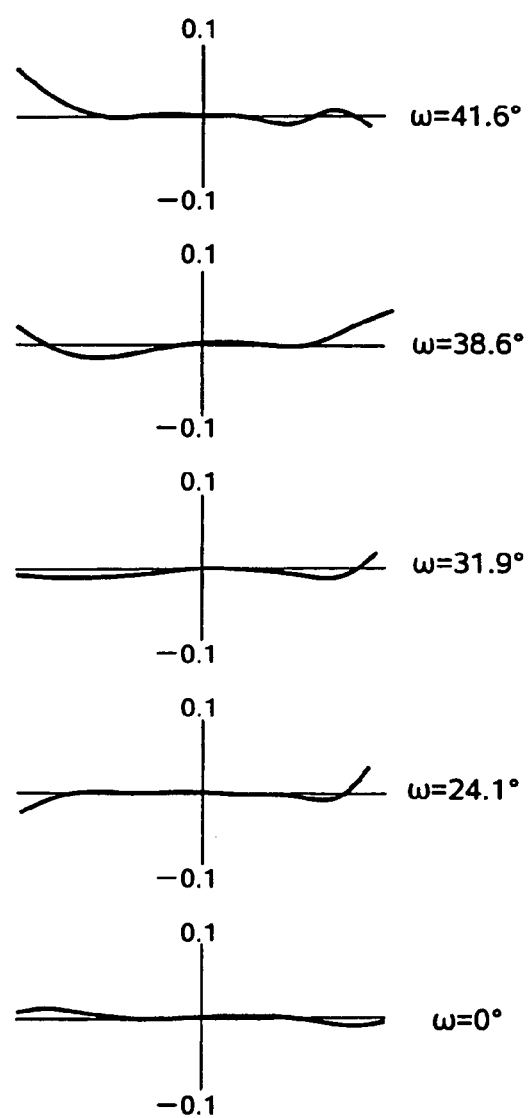

FIGS. 6A-6D show the spherical aberration, astigmatism, distortion, and coma, respectively, for the d-line (587.6 nm) of the large aperture wide-angle lens of Embodiment 3. In FIG. 6A, the spherical aberration is shown for an $F_{NO}$ equal to 1.99. FIGS. 6B and 6C show the astigmatism (in the sagittal image plane S and the tangential image plane T) and the distortion, respectively, up to a maximum half-field angle ω of 41.6 degrees. FIG. 6D shows the coma (in mm) for various half-field angles ω for both the tangential (right column) and sagittal (left column) image surfaces.

As is clear from FIGS. 6A-6D and Tables 7-9 above, Embodiment 3 of the present invention provides a large aperture wide-angle lens with an f-number of 1.994, a focal length of very nearly 24 mm, and excellent correction of aberrations throughout the field of view.

The invention being thus described, it will be obvious that the same may be varied in many ways. For instance, values such as the radius of curvature R of each of the lens elements, the surface spacing D, the refractive index $N_d$, as well as the Abbe number $v_d$, are not limited to the examples indicated in each of the aforementioned embodiments, as other values can be adopted. Also, lens elements that act as lens components may variously be modified as lens components that include more than one lens element, and the number of lens elements and lens components may be varied. Additionally, as indicated previously, the sixth lens element L6 may have positive refractive power on and near the optical axis with the refractive power becoming less positive and even negative toward the periphery or the sixth lens element L6 may have negative refractive power on and near the optical axis with the refractive power becoming more negative toward the periphery. Furthermore, a camera mounting the large aperture wide-angle lens of the present invention may make use of features of the lens of the present invention, such as short back focus, small length for easy retraction, and small lens diameter, in order to produce a very compact camera. Additionally, the large aperture wide-angle lens of the present invention may be used with image pickup devices other than photographic films, such as a CCD image pickup device. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A large aperture wide-angle lens comprising two lens groups, arranged in order along an optical axis from an object side toward an image side and with no intervening lens component, as follows:
   a first lens group;
   a stop; and
   a second lens group;

wherein said first lens group includes more than one lens element; and said second lens group includes, arranged in order along the optical axis from the object side of the second lens group and with no intervening lens component, a first lens component having at least one aspheric surface, having negative refractive power, and having increasingly negative refractive power from the optical axis toward the periphery, a second lens component having a convex surface on the image side, and a third lens component having at least one aspheric surface and having decreasingly positive refractive power or increasingly negative refractive power from the optical axis toward the periphery.

2. The large aperture wide-angle lens of claim 1, wherein the absolute value of the curvature of the image-side surface of said second lens component is greater than the absolute value of the curvature of the object-side surface of said second lens component.

3. The large aperture wide-angle lens of claim 1, wherein the image-side surface of said third lens component faces a concave surface of a fourth lens component having negative refractive power.

4. The large aperture wide-angle lens of claim 1, wherein said first lens component has negative refractive power, and said third lens component has a convex image-side surface.

5. The large aperture wide-angle lens of claim 1, wherein said first lens group comprises three lens elements, arranged in order along the optical axis and with no intervening lens component, as follows:

a biconcave lens element; and two lens elements, each having positive refractive power and each having a convex object-side surface.

6. The large aperture wide-angle lens of claim 1, wherein the following conditions are satisfied:

$1.7 < F_{NO} < 2.8$ $0.77 < Y/f < 1.1$ where $F_{NO}$ is the f-number of the large aperture wide-angle lens;

Y is the maximum image height at the image plane of the large aperture wide-angle lens; and f is the focal length of the large aperture wide-angle lens.

7. The large aperture wide-angle lens of claim 1, wherein said first lens component includes only a single lens element and the following condition is satisfied:

$Nd_{21} > 1.65$ where $Nd_{21}$ is the refractive index of said single lens element at the d-line.

8. A camera including the large aperture wide-angle lens of claim 1.

9. The large aperture wide-angle lens of claim 1, wherein the large aperture wide-angle lens includes only seven lens elements.

10. The large aperture wide-angle lens of claim 2, wherein the large aperture wide-angle lens includes only seven lens elements.

11. The large aperture wide-angle lens of claim 3, wherein the large aperture wide-angle lens includes only seven lens elements.

12. The large aperture wide-angle lens of claim 4, wherein the large aperture wide-angle lens includes only seven lens elements.

13. The large aperture wide-angle lens of claim 5, wherein the large aperture wide-angle lens includes only seven lens elements.

14. The large aperture wide-angle lens of claim 6, wherein the large aperture wide-angle lens includes only seven lens elements.

15. The large aperture wide-angle lens of claim 7, wherein the large aperture wide-angle lens includes only seven lens elements.

16. A camera including the large aperture wide-angle lens of claim 9.

17. The large aperture wide-angle lens of claim 1, wherein said first lens component consists of a first lens element, said second lens component consists of a second lens element, and said third lens component consists of a third lens element.

18. A camera including the large aperture wide-angle lens of claim 17.

19. The large aperture wide-angle lens of claim 17, wherein the large aperture wide-angle lens includes only seven lens elements.

20. The large aperture wide-angle lens of claim 9, wherein said first lens group includes only three lens elements, arranged in order along the optical axis, as follows:

a biconcave lens element; and two lens elements, each having positive refractive power and each having a convex object-side surface.

* * * * *

UNITED STATES PATENT AND TRADEMARK OFFICE
CERTIFICATE OF CORRECTION

PATENT NO.         : 7,227,694 B2
APPLICATION NO. : 11/152061
DATED              : June 5, 2007
INVENTOR(S)       : Toyama It is certified that error appears in the above-identified patent and that said Letters Patent is hereby corrected as shown below:

Column 4
Line 24, change "element" to -- elements --; and

Column 10
Line 10, change "angles c" to -- angles $\omega$--.

Signed and Sealed this

Twenty-first Day of August, 2007

JON W. DUDAS
*Director of the United States Patent and Trademark Office*